United States Patent [19]

Domenico

[11] Patent Number: 4,632,213
[45] Date of Patent: Dec. 30, 1986

[54] SEISMIC SOURCE SYSTEM FOR USE IN WATER COVERED AREA

[75] Inventor: Samuel N. Domenico, Tulsa, Okla.

[73] Assignee: Standard Oil Company (Indiana), Chicago, Ill.

[21] Appl. No.: 470,665

[22] Filed: Feb. 28, 1983

[51] Int. Cl.$^4$ .......................... G01V 1/40; G01V 1/04; G01V 1/38; H04R 1/02
[52] U.S. Cl. .................... 181/106; 181/115; 181/120; 367/141; 367/144
[58] Field of Search .............. 367/15, 16, 21, 23, 367/49, 144, 145, 146, 153, 154, 141; 181/115, 116, 104, 106, 111, 115, 120

[56] References Cited

U.S. PATENT DOCUMENTS

| | | | |
|---|---|---|---|
| 2,586,706 | 2/1952 | Parr, Jr. | 367/145 X |
| 3,563,334 | 2/1971 | McCarter | 181/118 |
| 3,592,286 | 7/1971 | Johnson | 367/21 |
| 3,658,149 | 4/1972 | Neal et al. | 181/118 |
| 3,724,374 | 4/1973 | Somerville et al. | 367/145 X |
| 4,006,794 | 2/1977 | Itria | 181/118 X |
| 4,132,974 | 1/1979 | Mollere | 367/15 |
| 4,189,026 | 2/1980 | Elliot | 367/145 X |

FOREIGN PATENT DOCUMENTS

| | | | |
|---|---|---|---|
| 1376513 | 12/1974 | United Kingdom | 367/15 |
| 2062227 | 5/1981 | United Kingdom | 181/118 |

*Primary Examiner*—Charles T. Jordan
*Assistant Examiner*—Brian S. Steinberger
*Attorney, Agent, or Firm*—Timothy H. Briggs

[57] ABSTRACT

Apparatus for forming a downwardly directed beam of acoustic wave energy in a body of water, comprising a source of acoustic wave energy such as a water gun, supported at a selected depth in the body of water. Means are provided above and around the source in the form of a series of concentric circular tubes of selected diameters and spacing so that the enveloping surface is a paraboloid. A large number of small perforations are spaced along these horizontal tubes through which compressed gas, which is supplied to the tubes, can escape and form spaced rising columns with small gas bubbles in the volume of water above the paraboloid. The highly reflecting contact surface between the water within the paraboloid and the gas-water mixture above the paraboloid causes downward reflection of seismic energy from the source in the form of plain waves of seismic energy.

2 Claims, 4 Drawing Figures

SEISMIC SOURCE SYSTEM FOR USE IN WATER COVERED AREA

CROSS REFERENCES TO RELATED APPLICATIONS

This invention is related to my copending application Ser. No. 06/470664 filed on the same date as this application and entitled "A Moving Seismic Source System for Use in Water Covered Areas."

BACKGROUND OF THE INVENTION

1. Field of the Invention

This invention lies in the field of seismic sources for use in water covered areas. More particularly, my invention concerns a type of seismic source which while producing downwardly going acoustic waves, effectively prevents such waves from going upward and sideways from the source, thus eliminating or highly attenuating troublesome acoustic waves that reflect off the surface of the water or that travel horizontally within the water layer.

In the seismic exploration industry, important data required is the velocity or propagation of seismic waves in the underlying layers of the earth. In the practice of seismic prospecting this has generally been done by finding or creating a deep borehole that goes down to the depth for which velocity information is desired. A sonde is lowered by means of a conductor cable, which contains one or more seismic sensors. If three sensors are used, the axis of sensitivity of two sensors (or seismometers or geophones) are generally pointed in the orthogonal horizontal directions and the third one in the vertical direction.

A seismic wave source is provided at a selected depth in the water in the vicinity of the borehole. The seismic wave that is generated, on its way down into the earth, will pass by the sensor or seismometer suspended in the borehole at a selected depth. Thus, the overall travel time from the source to the well seismometer can be determined. Furthermore, energy that is directed downward and reaches an underlying geological interface, will be reflected upwardly and will also reach the well geophone. With this kind of information, and with the well geophone at selected different depths from below the surface to deep in the earth, a series of seismic traces can be provided which represent seismic energy received by the well geophone. These series of traces then provide a great amount of information regarding the type of elastic waves that travel up and down in the earth, such as compressional or shear waves for example, and of their velocities of propagation in the subsurface formation. This operation is known generally as vertical seismic profiling.

2. Comments Relating to Prior Art

In the prior art, there are patents and publications describing experiments and devices in which a screen of air or gas bubbles within a water body are provided to attenuate high level acoustic waves from passing through the water body, and through the volume which has the partial gas saturation. The art which I have uncovered is related to special cases where undesired acoustic waves or noise are attenuated. All the prior art discovered included solely the absorption and attenuation effect of the gas saturation volume of water. No art was found which related to the reflected and focusing of acoustic waves at the interface between the gas-water mixture volume and the remaining body of water.

BRIEF SUMMARY OF THE INVENTION

It is the primary object of this invention to provide a seismic source system which provides a directed beam of acoustic wave energy and causes a much lower level of interfering waves created by the reflection at the top surface of a body of water, and by horizontally traveling acoustic waves in the water layer. This invention relates to the reflection and focusing of acoustic waves at a specially shaped interface between a gas-water mixture and the remaining body of water. The term "gas-water mixture" is defined as "water with at least a small percentage of free gas or air in the water." However, it can include water with as little as 0.5% gas by volume to essentially or nearly all gas.

The presence of gas in the water causes a much lower velocity of travel of acoustic waves than the velocity in gas-free water. Therefore, there is a high reflectivity for acoustic waves which are initiated in the water body, as they attempt to pass through the bonding surface (interface). The other feature of this physical situation is that whatever energy does pass through this interface becomes highly attenuated in the gas-water mixture. Thus, when both the reflecting capability and the attenuating capability of this physical system is considered as it is in this invention, there is greatly reduced noise generated by upward moving energy from the source, which would be reflected at the surface and which would travel downwardly as from a ghost source.

This invention will be described for convenience in terms of a practical operating seismic source which is used for generating downwardly moving acoustic wave energy for determination of velocity of travel and nature of travel paths (vertical seismic profiling) of seismic waves in the earth. This application of the principle to the seismic velocity and/or travel paths determination process is for illustration purposes solely, and is not limited in any way to any particular type of liquid-gas mixture or direction of the axis of the beam.

The above and other objects are realized and the limitations of the prior art overcome in this invention by providing a structure which surrounds and substantially covers the source. The shape of the structure is preferably in the form of a paraboloid. A paraboloid has the property that if a point source generates a spherical wave at the focus of the paraboloid, any energy that goes upwardly or sideways towards the wall of the paraboloid will be reflected downwardly, through the lower open end of the paraboloid, and all such downwardly directed seismic energy will be in phase, and therefore form a parallel series of circular planar wave fronts moving in the direction of the axis of the paraboloid.

It will be clear that directing most of the energy from the source in a downwardly direction and reducing the amount of the energy from the source that moves upwardly to the surface of the water is beneficial. If a single freely suspended source is placed in the water as much energy will go up or toward the surface as goes down into the earth. The upwardly directed energy will form a second source of energy upon reflection at the surface which is called a ghost reflection since it has traveled upwardly from the source to the surface and back down and, therefore timing is delayed by a selected interval of travel time. While limiting the amount of energy that goes up to the surface by reflecting most of it downwardly and attenuating the remainder, there will be no noticeable ghost reflections. Therefore, a much clearer seismic record will be formed from which more precise seismic data can be derived. As will be shown later, the downwardly moving reflected energy from the paraboloid will be several times greater than the energy normally moving downwardly from the source. The key to this action of the paraboloid is, of course, the high degree of reflection of acoustic wave energy from the surface of the paraboloid. This interface is provided by bonding the surface on the inside by normal water, without any free gas, and bonding the other side of the interface with a gas-water mixture or by an enclosed volume of gas.

BRIEF DESCRIPTION OF THE DRAWINGS

These and other objects and the advantages of this invention, and a better understanding of the principles and details of this invention will be evident from the following description taken in conjunction with the appended drawings in which.

DESCRIPTION OF THE PREFERRED EMBODIMENT

Figure 1:
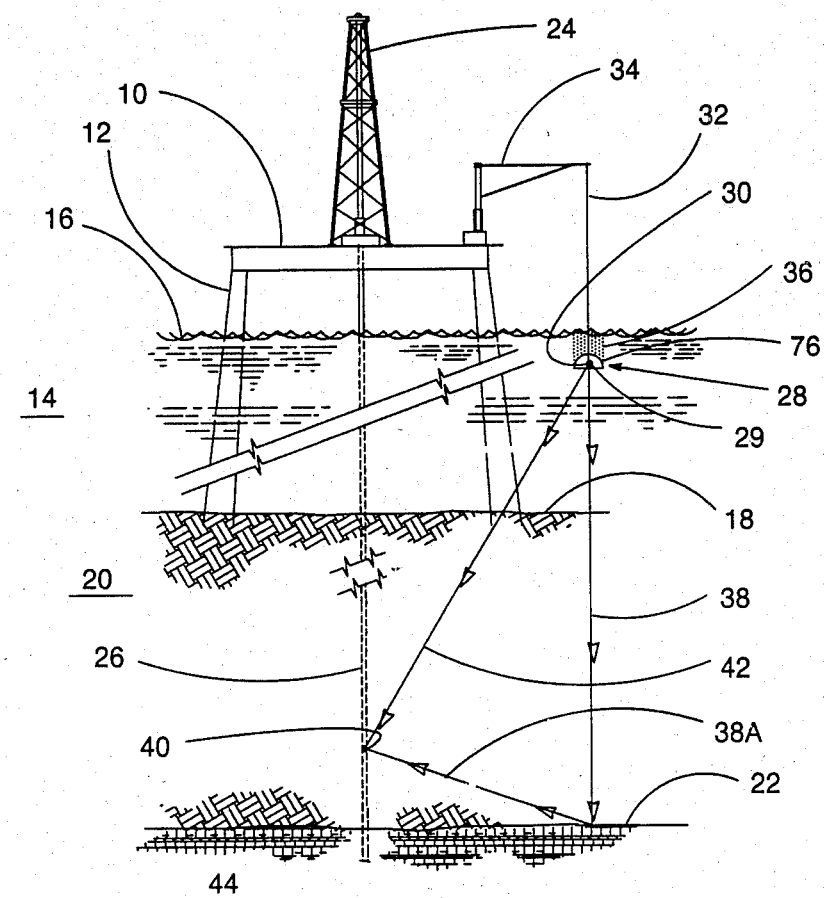
FIG. 1 represents schematically an elevation view of a seismic operation in which velocity data of the subsurface geological formation is being determined in a water covered area.

Referring now to the drawings and in particular to FIG. 1 there is shown schematically an elevation view through the earth, of a drilling platform 10 having legs 12 which rests on the water interface 18. A body of water 14 has a surface 16. A borehole 26 is shown, which would normally be cased and which goes down to a selected depth of a subformation 44. The drilling apparatus is shown schematically by the tower 24. A well geophone 40 is lowered into the casing 26 by means of a conductor cable, not shown, but well known in the art. A seismic source 29 which, for example, can be a water gun, is positioned at a selected depth below the surface 16 and a paraboloid structure indicated generally by the numeral 28 surrounds the source 29. The focus is at 30 which is at the point of placement of the source 29.

Figure 3:
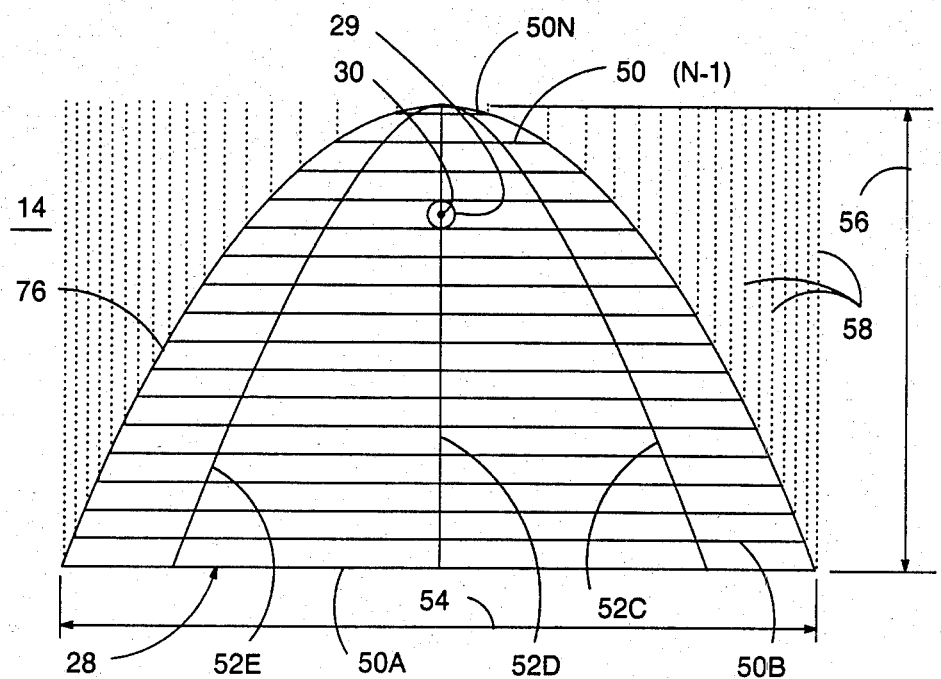
FIGS. 2 and 3 illustrate in plan an elevation of one type structure which can provide a paraboloid, the surface of which bounds a body of water in contact with the volume of gas-water mixture including a selected ratio of gas to water.
Figure 2:
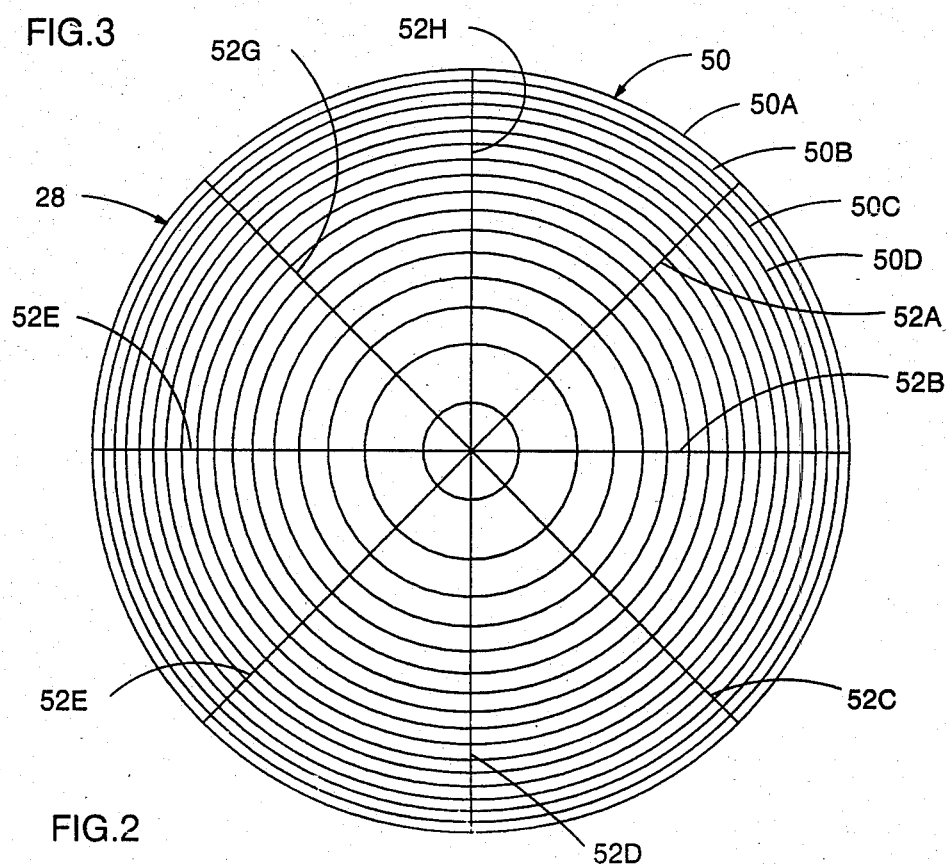

The structure 28, which will be described more completely hereinafter in relation to FIGS. 2 and 3, provides for a plurality of coaxial horizontal circular pipes, defining a paraboloid, which are supplied with air under pressure. They have a plurality of small perforations in which air escapes in the form of rising columns of bubbles 36. Structure 28 and the source 29 are supported by conductor cables 32 from the derrick 34 in a conventional manner so that the circular pipes forming the paraboloid can be positioned at a selected stationary position in the body of water.

Also shown are two acoustic rays from the source 29. One ray 42 goes directly to the well geophone 40, and the other ray 38 goes down to the geological interface 22 between the formations 20 and 44, and then reflects upwardly, as shown by ray 38A, toward the surface, and intersects the well geophone.

Not shown in detail, but well known in the art, is the well geophone 40 with one or more acoustic sensors which generate electrical signals in response to the seismic energy. The signals are carried by cables up to the surface where they are amplified and recorded for later processing. Processing is well known in the art, and will not be described further since it is substantially conventional.

What is described, of course, is a means for providing a volume which is distinct and separate from the surrounding body of water. The volume will normally be water in which air is introduced in a dispersed manner, in the form of rising columns 36 of small bubbles. This is indicated schematically in FIG. 1.

FIGS. 2 and 3 show, in greater detail, examples of one physical structure that creates a stream of rising bubbles of gas in the water above the outer surface of the paraboloid. Inside of the surface 76 is the undisturbed water which is a part of the body of water 14. This can be an offshore body of water, such as an ocean, or bay or a lake, etc. The volume of gas-water mixture shown by the rising columns of bubbles 58 will be called disturbed water or a gas-water mixture, because in this volume, whatever its shapes or size, the water will contain free gas and therefore will have different physical properties than water in the body of water.

The structure of the paraboloid as shown in FIGS. 2 and 3 is a series of circular tubes or pipes in which the circles have different diameters. These may be rigid or flexible, and are supplied compressed gas such as air, by means not shown, but well known in the art. The gas is supplied by pipes 52A, 52B, 52C, ... 52H, for example. Gas bubbles from the small perforations in the pipe 50A and 50B, etc., will form the interface 76 along the surface of paraboloid between the body of undisturbed water inside and water-gas mixture outside. This interface 76 is the reflecting surface.

The acoustic velocity in a volume of water is greatly reduced even for a very small content of gas within the water. That is, as small as 0.5% volume of gas in water can greatly reduce the velocity of acoustic waves in the gas-water mixture. This creates a highly reflecting surface between the volume of water containing free gas and the body of normal water not having free gas.

Figure 4:
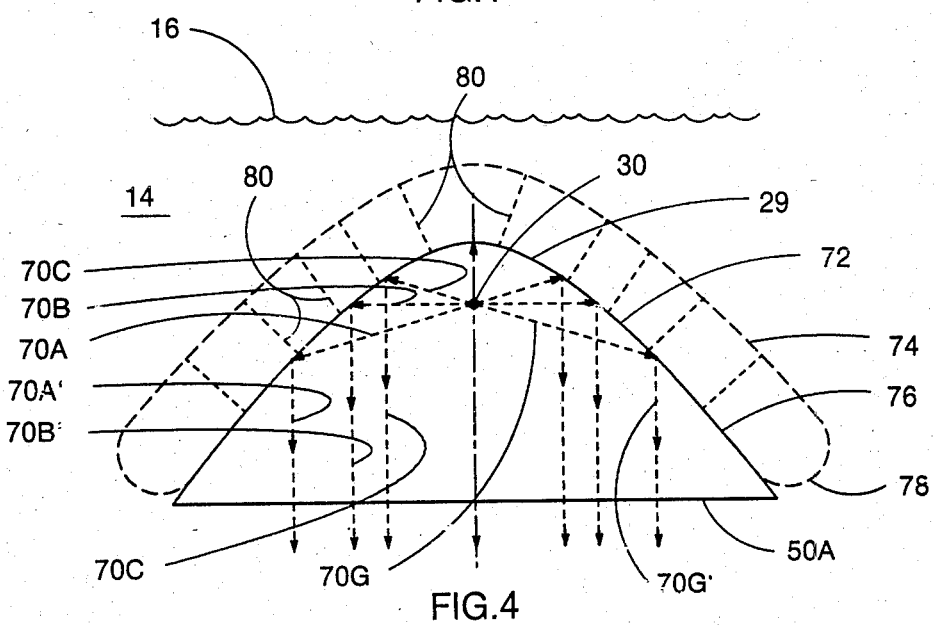
FIG. 4 is a schematic elevation view of a paraboloid having a source and focus and showing the manner in which seismic waves are emitted from the source and reflected from the paraboloid reflecting surface, to form a downgoing beam. A second embodiment is also shown in FIG. 4 in which the upper side of the paraboloid contains only gas and is in a volume which is bounded by plastic sheets of selected thin flexible materials to form a closed bag which is filled with air or gas at a selected pressure, and provides a high reflecting interface necessary at the boundary of the paraboloid.

Referring to FIG. 4, there is shown a paraboloid similar to that of FIG. 3 with a source 29 position at the focus 30 of the paraboloid which is shown in vertical section. Various waves 70A, 70B, 70C, ... 70G, etc., are shown at different angles, and are shown reflecting from the interface 76 between the water containing gas volume and the gas free water. These waves are reflected downwardly at the reflecting point to form a downwardly directed beam of acoustic waves which are all in phase. Actually, the definition of a paraboloid is a three-dimensional curved surface that, with a source placed at the focus, will form a directed beam of acoustic energy. This illustrates the manner by which the beam is formed.

The paraboloid can be made in a variety of ways, one of which is shown in FIGS. 2 and 3. A second embodiment is shown in FIG. 4 and is in the form of a plastic bag that has an interior surface to conform to the outer surface 76 of the paraboloid. There is an outer surface 74 that is somewhat in the same shape as the surface 76 and the two surfaces are closed or sealed by means of a circular strip 78 at the bottom. There may be tension members 80 shown by dashed lines joining the two sections 74 and 76 to maintain a constant spacing thereby maintaining the shape shown. A gas such as air is contained in the interior between the surfaces 74 and 76. With suitable internal tension members to maintain the inner surface 76 in the form of paraboloid, the bag 76, even without the pipe structure to support it, might form a sufficient accurate paraboloid so that the bag surface 76 alone could be the reflecting surface which creates the downwardly directed beam. If the volume of gas contained between the surfaces 74 and 76 is sufficiently great, so as to produce strong buoyant force, then weights might need to be applied to counteract this force.

Other ways can be found for creating a paraboloid surface. Also, other ways can be used to provide a gas-liquid mixture such as by means of chemicals or by forming a foam, etc.

It will be clear that any type of seismic source can be used, such as explosive, air gun and so forth, although the preferred type is a water gun, since it inherently provides a clean signal free of bubble pulses.

While the invention has been described with a certain degree of particularity, it is manifest that many changes may be made in the details of construction and the arrangement of components without departing from the spirit and scope of this disclosure. It is understood the invention is not limited to the exemplified embodiments set forth herein, but is to be limited only by the scope of the attached claim or claims, including the full range of equivalency to which each element thereof is entitled.

What is claimed is:

1. An apparatus for reflecting acoustic wave energy in water in phase in a downwardly directed beam and for attenuating upwardly and horizontally traveling acoustic wave energy from an acoustic wave energy source suspended in the water wherein seismic sensor means are supported in a wellbore in the vicinity of the acoustic wave energy source comprising:

gas releasing means for releasing gas into said water and for forming a body of water containing rising gas bubbles above and laterally around the acoustic wave energy source, wherein the gas releasing means comprises a plurality of coaxial horizontal circular pipes arranged vertically with spaces between adjacent pipes, in the shape of a paraboloid, with its vertical axis through the position of the acoustic wave energy source and being concaved downwardly, each of said pipes having a plurality of perforations; and means to supply said pipes with pressurized gas.

2. A method for reflecting acoustic wave energy in water in phase in a downwardly directed beam and for attenuating upwardly and horizontally traveling acoustic wave energy from an acoustic wave energy source suspended in water wherein the seismic sensor means are supported in a wellbore in the vicinity of the acoustic wave energy source comprising:

utilizing a gas releasing means for releasing gas into said water and for forming a body of water containing rising gas bubbles above and around the acoustic wave energy source, wherein the gas releasing means comprises a plurality of coaxial horizontal circular pipes arranged vertically with spaces between adjacent pipes in the shape of a paraboloid, with its vertical axis through the position of the acoustic wave energy source and being concaved downwardly, each of said pipes having a plurality of perforations, and means to supply said pipes with pressurized gas; and supplying gas to said means to supply said pipes with pressurized gas.

* * * * *